US006812601B2

(12) United States Patent
Gamble et al.

(10) Patent No.: US 6,812,601 B2
(45) Date of Patent: Nov. 2, 2004

(54) SUPERCONDUCTOR ROTOR COOLING SYSTEM

(75) Inventors: Bruce B. Gamble, Wellesley, MA (US); Ahmed Sidi-Yekhlef, Framingham, MA (US); Robert E. Schwall, Northborough, MA (US); David I. Driscoll, South Euclid, OH (US); Boris A. Shoykhet, Beachwood, OH (US)

(73) Assignee: American Superconductor Corporation, Westborough, MA (US)

( * ) Notice: Subject to any disclaimer, the term of this patent is extended or adjusted under 35 U.S.C. 154(b) by 148 days.

(21) Appl. No.: 10/128,535

(22) Filed: Apr. 23, 2002

(65) Prior Publication Data

US 2003/0107275 A1 Jun. 12, 2003

Related U.S. Application Data

(63) Continuation of application No. 09/140,154, filed on Aug. 26, 1998, now Pat. No. 6,376,943.

(51) Int. Cl.[7] ............................................... H02K 9/00
(52) U.S. Cl. ............................ 310/52; 310/54; 310/64; 505/166; 62/52.1
(58) Field of Search ............................ 310/52, 54, 64; 505/166; 53/51.1

(56) References Cited

U.S. PATENT DOCUMENTS

| | | | |
|---|---|---|---|
| 319,434 A | 6/1885 | Wren | |
| 2,844,745 A | 7/1958 | Hamm | |
| 3,492,830 A | 2/1970 | Mulder | |
| 3,626,717 A | * 12/1971 | Lorch | ........................ 62/605 |
| 3,704,600 A | 12/1972 | Prast et al. | |
| 3,882,687 A | 5/1975 | Asztalos et al. | |
| 3,963,950 A | 6/1976 | Watanabe et al. | |
| 4,079,273 A | 3/1978 | Lambrecht et al. | ........... 310/52 |

(List continued on next page.)

FOREIGN PATENT DOCUMENTS

| | | | | |
|---|---|---|---|---|
| DE | 10057664 A1 | * | 5/2002 | .......... H02K/55/00 |
| GB | 2030787 A | | 4/1980 | |
| JP | 60029591 A | * | 2/1985 | .......... F28D/15/02 |
| JP | 61070387 A | * | 4/1986 | .......... F28D/15/02 |
| JP | 08189715 A | * | 7/1996 | ............. F25B/9/00 |
| JP | 09074716 | | 3/1997 | ............ H02K/9/22 |
| RU | 678598 A | * | 8/1979 | .......... H01L/39/02 |
| SU | 678-598 | * | 8/1979 | |
| WO | 99/04477 | * | 1/1999 | |
| WO | WO 9904477 A2 | * | 1/1999 | |

OTHER PUBLICATIONS

Gamble et al., "Cooling System for Superconducting Magnet", U.S. Ser. No. 08/844,991, filed Apr. 23, 1997.

(List continued on next page.)

Primary Examiner—Joseph Waks
(74) Attorney, Agent, or Firm—Fish & Richardson P.C.

(57) ABSTRACT

A system for cooling a superconductor device includes a cryocooler located in a stationary reference frame and a closed circulation system external to the cryocooler. The closed circulation system interfaces the stationary reference frame with a rotating reference frame in which the superconductor device is located. A method of cooling a superconductor device includes locating a cryocooler in a stationary reference frame, and transferring heat from a superconductor device located in a rotating reference frame to the cryocooler through a closed circulation system external to the cryocooler. The closed circulation system interfaces the stationary reference frame with the rotating reference frame.

8 Claims, 6 Drawing Sheets

U.S. PATENT DOCUMENTS

| | | | |
|---|---|---|---|
| 4,101,793 A | 7/1978 | Berthet et al. ................ 310/52 | |
| 4,111,002 A | 9/1978 | Van Mal et al. | |
| 4,123,677 A | 10/1978 | Laskaris et al. | |
| 4,164,126 A | 8/1979 | Laskaris et al. | |
| 4,223,239 A | 9/1980 | Eckels .......................... 310/52 | |
| 4,236,091 A | * 11/1980 | Kutateladze et al. .......... 310/64 | |
| 4,240,000 A | * 12/1980 | Harano et al. ................ 310/54 | |
| 4,242,885 A | 1/1981 | Quack et al. | |
| 4,275,320 A | 6/1981 | Baumann et al. ............. 310/52 | |
| 4,292,558 A | 9/1981 | Flick et al. | |
| 4,315,172 A | 2/1982 | Intichar et al. ............... 310/53 | |
| 4,323,800 A | 4/1982 | Hofmann ...................... 310/52 | |
| 4,339,680 A | 7/1982 | Flecher et al. ................ 310/62 | |
| 4,366,680 A | 1/1983 | Lovelace et al. | |
| 4,406,959 A | 9/1983 | Harano et al. ................ 310/58 | |
| 4,427,907 A | 1/1984 | Flick et al. | |
| 4,448,042 A | 5/1984 | Yamaguchi et al. .......... 62/505 | |
| 4,488,406 A | 12/1984 | Eckels | |
| 4,576,009 A | 3/1986 | Ogushi et al. | |
| 4,692,560 A | 9/1987 | Hotta et al. | |
| 4,697,425 A | 10/1987 | Jones | |
| 4,727,724 A | 3/1988 | Intichar et al. ............. 622/55.5 | |
| 4,816,708 A | * 3/1989 | Laumond ...................... 310/52 | |
| 4,862,023 A | 8/1989 | Laumond et al. ............. 310/54 | |
| 4,872,314 A | 10/1989 | Asano et al. | |
| 5,032,748 A | * 7/1991 | Sakuraba et al. ............. 310/52 | |
| 5,140,204 A | * 8/1992 | Cashmore et al. ............ 310/61 | |
| 5,193,349 A | 3/1993 | Laverman et al. | |
| 5,325,002 A | * 6/1994 | Rabinowitz et al. ........ 505/166 | |
| 5,394,040 A | * 2/1995 | Khanh ......................... 310/64 | |
| 5,461,873 A | 10/1995 | Longsworth | |
| 5,469,711 A | 11/1995 | McCoy | |
| 5,482,919 A | 1/1996 | Joshi ........................... 310/52 | |
| 5,485,730 A | * 1/1996 | Herd .......................... 62/51.1 | |
| 5,513,498 A | * 5/1996 | Ackermann et al. ......... 62/51.1 | |
| 5,548,168 A | * 8/1996 | Laskaris et al. .............. 310/52 | |
| 5,629,573 A | 5/1997 | Ponnappan ................... 310/64 | |
| 5,737,927 A | * 4/1998 | Takahashi et al. ........... 62/51.1 | |
| 5,777,420 A | 7/1998 | Gamble et al. | |
| 5,848,532 A | * 12/1998 | Gamble et al. .............. 62/48.2 | |
| 6,532,748 B1 | * 3/2003 | Yuan et al. ....................... 62/6 | |

OTHER PUBLICATIONS

Gamble, The American Society of Mechanical Engineers, "The Development of a Rotating Liquid Helium Flow Circuit", pp. 2–7, Aug. 1977.

Gamble et al., 1975 Joint Power Generation Conference, "Superconductive Generator Development", pp. 1–11, Sep.–Oct. 1975.

Gamble, General Electric Company, "Development of a Helium Transfer Coupling for a Superconducting Generator Rotor", vol. 23, pp. 125–131, 1972.

Thul Len et al., Massachusetts Institute of Technology, "MIT–EEI Superconducting Synchronous Machine", vol. 18, pp. 372–381, 1997.

Electric Power Research Institue, EL–663 vol. 1, "Superconductor Generator Design," Contract #RP429–2, Mar. 1978, pp. 3–116 to 3–131.

Memorandum by Mr. Bruce Gamble regarding references: "Development of a Coolant Circuit for Rotors to Superconducting Generators," P.A. Rios, B.B. Gamble and E.T. Laskaris presented at the Conference of Technical Applications of Superconductivity, USSR, 1975 (GE); and Electric Power Research Institute, vol. 1, "Superconductor Generator Design Final Technical Report," Contract #RP429–2, Dec. 1977.

European Search Report dated Apr. 4, 2000 (Application No. 98911374.1).

* cited by examiner

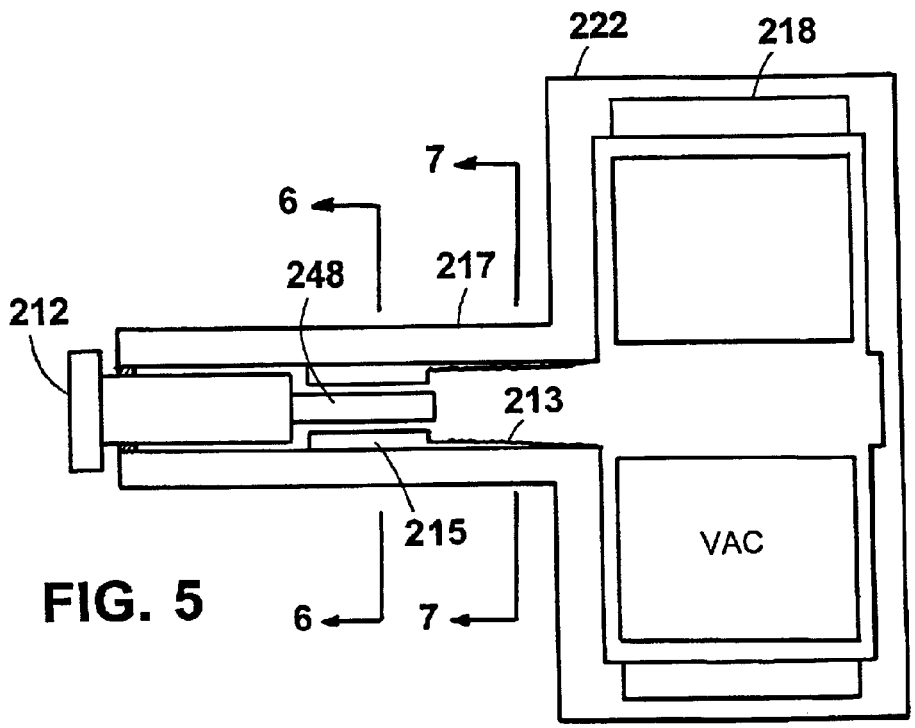
FIG. 5
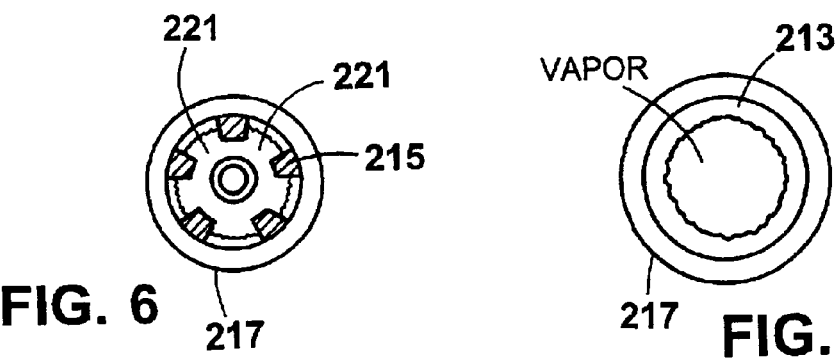
FIG. 6
FIG. 7

SUPERCONDUCTOR ROTOR COOLING SYSTEM

RELATED APPLICATION

This application is a continuation and claims the benefit of priority under 35 USC 120 of U.S. application Ser. No. 09/140,154, filed Aug. 26, 1998 now U.S. Pat. No. 6,376,943. The disclosure of the prior application is considered part of and is incorporated by reference in the disclosure of this application.

STATEMENT AS TO FEDERALLY SPONSORED RESEARCH

This invention was made with Government support under Contract No. DE-FC02-93CH10580 awarded by the Department of Energy. The Government has certain rights in this invention.

BACKGROUND OF THE INVENTION

People have been concerned with how to cool the rotating elements of a superconductor magnet. High temperature superconductor magnets typically need to be cooled to a temperature of about 20–77 K during use.

It is known to place a cryocooler in the rotating reference frame of the magnet to cool the magnet windings. It is also known to force circulate a fluid between a stationary refrigerator and a rotating field winding.

SUMMARY OF THE INVENTION

According to one aspect of the invention, a system for cooling a superconductor device includes a cryocooler located in a stationary reference frame and a closed circulation system external to the cryocooler. The closed circulation system interfaces the stationary reference frame with a rotating reference frame in which the superconductor device is located.

Embodiments of this aspect of the invention may include one or more of the following features.

The closed circulation system includes a heat transfer assembly located in the rotating reference frame. A heat transfer gap is defined between the cryocooler and the heat transfer assembly. Heat is transferred from the superconductor device to the heat transfer gap by the heat transfer assembly. A coolant, for example, helium, is located in the heat transfer gap.

In illustrated embodiments, the rotating heat transfer assembly includes a heat pipe having a first fluid path for directing a flow of liquid coolant, for example, liquid neon, from a cold end to a warm end of the heat transfer assembly, and a second fluid path for directing a flow of gas coolant, for example, neon gas, from the warm end to the cold end of the heat transfer assembly.

A warm end conduction block is mounted to the superconductor device and the heat pipe. The warm end conduction block defines the warm end of the heat transfer assembly. A cold end conduction block is mounted to the heat pipe and defines the cold end of the heat transfer assembly. The cold end conduction block includes a first plurality of fins and the cryocooler includes a second plurality of fins intermeshed with the first plurality of fins. The cold end conduction block fins are rotatable with respect to the cryocooler fins. Space between the intermeshed fins defines the heat transfer gap.

In particular embodiments, a cooldown path containing, for example, liquid nitrogen or liquid oxygen, is provided to cool the superconductor device prior to rotation of the superconductor device.

The cryocooler can include a plurality of coldheads. A heat pipe extends from the plurality of coldheads. The heat transfer gap is defined between the heat pipe and the heat transfer assembly.

In particular embodiments, a coldhead of the cryocooler is located within an insulated enclosure. A rotatable shaft of the superconductor device extends into the enclosure. A cold end of the shaft includes a condenser having a first plurality of fins. The coldhead includes a second plurality of fins intermeshed with the condenser fins. The condenser fins are rotatable with respect to the coldhead fins.

In an other embodiment, a stationary cryocooler is positioned within a rotatable shaft of the superconductor device. The rotatable shaft defines flow channels for liquid coolant. The cryocooler includes an extension and coolant in the closed circulation system condenses upon contact with the extension. The extension is radially aligned with the superconductor coils of the superconductor device.

The closed circulation system includes a fluid path for delivering liquid coolant from a surface of the cryocooler to the superconductor device, and a second fluid path for returning coolant vapor from the superconductor device to the surface of the cryocooler.

According to another aspect of the invention, a superconductor rotor cooling system includes a cryocooler located in a stationary reference frame and a heat transfer assembly located in a rotating reference frame. A heat transfer gap defined between the cryocooler and the heat transfer assembly transfers heat from a superconductor device located in the rotating reference frame to the heat transfer gap.

According to another aspect of the invention, a method of cooling a superconductor device includes the steps of locating a cryocooler in a stationary reference frame, and transferring heat from a superconductor device located in a rotating reference frame to the cryocooler through a closed circulation system external to the cryocooler. The closed circulation system interfaces the stationary reference frame with the rotating reference frame.

According to another aspect of the invention, a method of cooling a superconductor device includes the steps of locating a cryocooler in a stationary reference frame, locating a heat transfer assembly in a rotating reference frame, and transferring heat from a superconductor device located in the rotating reference frame through the heat transfer assembly to a heat transfer gap defined between the cryocooler and the heat transfer assembly.

Among other advantages, the cooling system of the invention permits the cryocooler to remain stationary while eliminating the need for an extensive sealing system needed to flow coolant through an open circulation system. The heat transfer gap provides an efficient structure for transferring heat from the superconductor device to the cryocooler.

BRIEF DESCRIPTION OF THE DRAWINGS

Other objects, features and advantages of the invention will be apparent from the following description taken together with the drawings in which:

FIG. 5 is a cross-sectional side view of an alternative embodiment of a superconductor rotor cooling system;

FIG. 6 is an end view of the cooling system of FIG. 5, taken along lines 6—6 in FIG. 1;

FIG. 7 is an end view of the cooling system of FIG. 5, taken along lines 7—7 in FIG. 1;

DESCRIPTION OF THE PREFERRED EMBODIMENT

Figure 1:
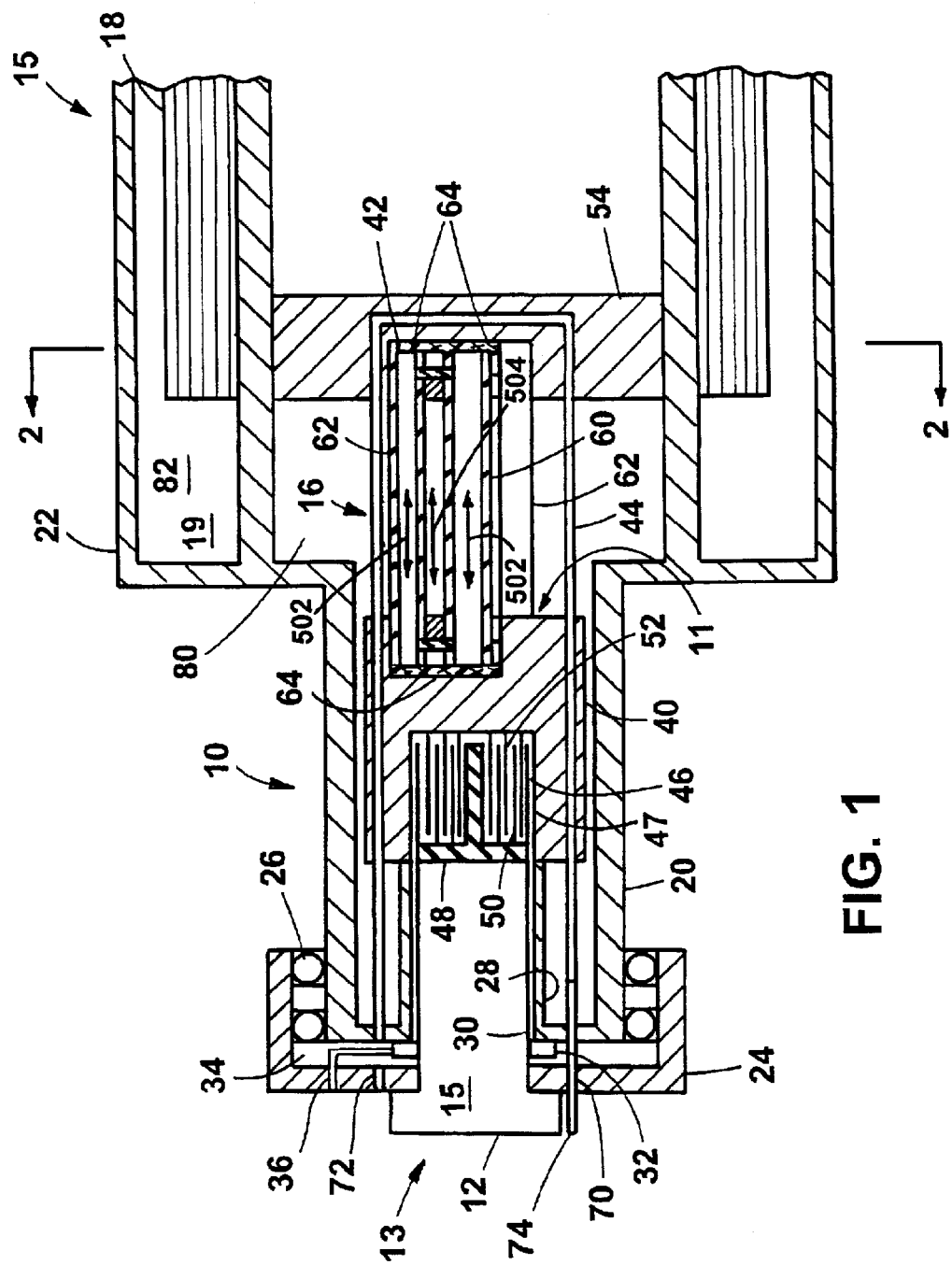
FIG. 1 is a cross-sectional side view of a superconductor rotor cooling system.

Referring to FIG. 1, a superconductor rotor cooling system 10 includes, for example, a Gifford-McMahon (GM) cryocooler 12 located in a stationary reference frame for cooling a high temperature superconductor winding 18 located in a rotating reference frame. Other cooling systems, for example, pulse tube or Stirling cryocoolers, could be used. Cryocooler 12 is located in a stationary reference frame rather than a rotating reference frame due to undesirable high gravity heat transfer seen internal to the cold head of the cryocooler when rotating.

A closed circulation system 11 of rotor cooling system 10 interfaces the two reference frames to transfer heat from a winding 18 of superconductor rotor 22 to cryocooler 12. Coolant within circulation system 11 at no time enters the cryocooler but rather is cooled by contact with an external surface of the cryocooler, described below. Heat transfer within the circulation system occurs by various means, for example, conduction, convection, and mass transport. No external force, for example, pumping, is applied to the coolant.

Cryocooler 12 is positioned within a hollow shaft 20 of a rotor 22. A bracket 24 mounted to shaft 20 on bearings 26 supports cryocooler 12 such that cryocooler 12 remains stationary while shaft 20 rotates. A relative motion gap 30 is defined between cryocooler 12 and an inner wall 28 of shaft 20. A seal 32, for example, a gas-to-gas, rubbing, or ferrofluidic seal, separates relative motion gap 30 from a region 34 within bracket 24. Relative motion gap 30 can be accessed by a feed line 36 which passes through bracket 24 and seal 32 to introduce a coolant, for example, helium or neon, into gap 30.

Circulation system 11 includes a heat transfer assembly 16 having a conduction cylinder 40, a heat pipe assembly 42, and a cooldown line 44. Relative motion gap 30 includes a heat transfer gap 46 defined between a copper extension 48 of cryocooler 12 and cylinder 40. As discussed below, cryocooler extension 48 and cylinder 40 include a series of interleaved fins 50, 52, respectively, which define heat transfer gap 46. Coolant within heat transfer gap 46 is cooled by contact with fins 50 of cryocooler extension 48.

When superconductor rotor 22 is in use, heat is generated by winding 18 and other parasitic heat leaks, such as radiation, conduction through structural supports and heat leak through the current leads. To dissipate the heat, heat is transferred by conduction to an inner cooling block 54. The heat is then transferred from cooling block 54 to cylinder 40 by heat pipe assembly 42. Cooling block 54, heat pipe assembly 42, and cylinder 40 are located in the rotating reference frame. The heat reaches cryocooler 12 by convection through the coolant located in gap 46.

Figure 2:
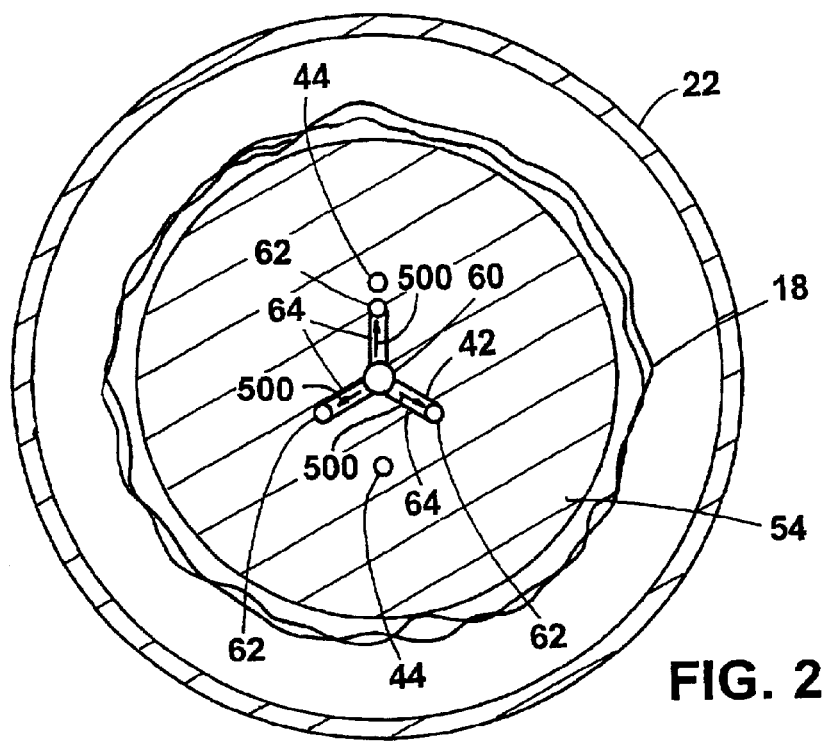
FIG. 2 is an end view of the cooling system, taken along lines 2—2 in FIG. 1.

Referring also to FIG. 2, heat pipe assembly 42 is preferably a gravity-based neon heat pipe and includes a central pipe 60, three outer pipes 62 equally spaced about central pipe 60, and connecting pipes 64, six in total, connected each end of outer pipes 62 to central pipe 60. When heat pipe assembly 42 rotates, the neon within the pipes flows radially outward to outer pipes 62 and toward the warmer end at cooling block 54. The warmed neon now in the form of a gas travels in central pipe 60 toward the colder end at cylinder 40. Thus, the neon in heat pipe assembly 42 is heated to a gas by conduction at cooling block 54, and is cooled to a liquid by conduction at cylinder 40. This mass flux transfers the heat flow from cooling block 54 to cylinder 40. The liquid and vapor flow results in a pressure head. A liquid head is provided by liquid neon located in connecting pipes 64 to balance the pressure drop of the pressure head.

When heat pipe assembly 42 is not rotating, for example, during cooldown of superconducting rotor 22, heat pipe assembly 42 operates in a gravity based mode. Flow is provided by the liquid head acted upon by gravity. Under these conditions, a 0.25 inch head has been calculated to be sufficient to support a heat flux of 60 watts for tube dimensions given below. With heat pipe assembly 42 charged to 900 psi with neon, at 27 K it has been calculated that there is sufficient liquid to fill outer pipes 62.

To decrease cooldown time, liquid nitrogen can be delivered to cooling block 54 to decrease the temperature of winding 18 from ambient to 77 K. The liquid nitrogen is introduced at entry port 70 of cooldown line 44. The liquid nitrogen flowing through cooldown line 44 is heated by conduction at cooling block 54, and the nitrogen vapor exits cooldown line 44 at exit port 72. A bayonet type vacuum probe 74 is preferably inserted into entry port 70 during cooldown with liquid nitrogen introduced into cooldown line 44 through vacuum probe 74.

Figure 3:
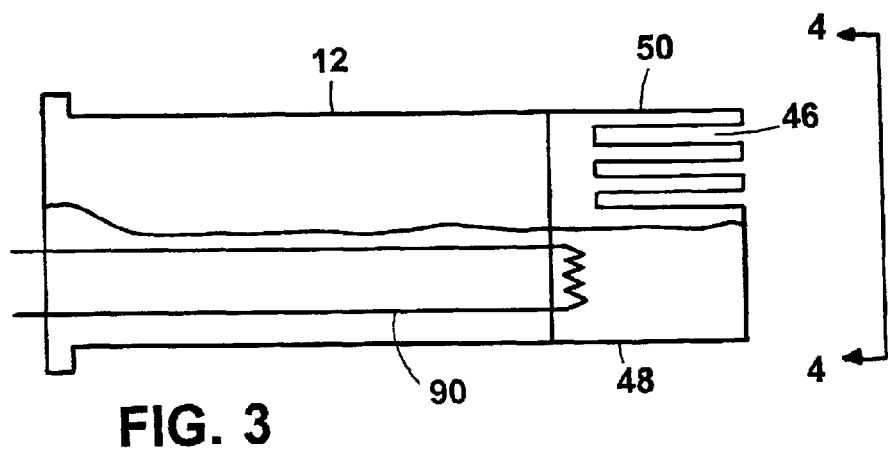
FIG. 3 is a partially cut-away side view of a cryocooler of the cooling system of FIG. 1.
Figure 4:
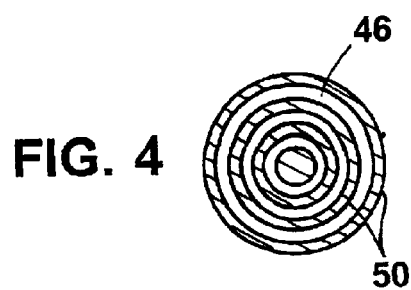
FIG. 4 is an end view of the cryocooler, taken along lines 4—4 in FIG. 3.

Referring to FIGS. 3 and 4, fins 50 on cryocooler extension 48 are circular and concentrically arranged. Corresponding fins 52 on cylinder 40 are also circular and concentrically arranged such that fins 50, 52 intermesh as shown in FIG. 1. With a gap 46 of about 0.03 inch, fins 50, 52 act to limit the temperature drop across heat transfer gap 46 to a few degrees Kelvin by increasing the surface area for heat transfer and by enhancing mixing and therefore increasing the convective heat transfer coefficient of the coolant located within heat transfer gap 46. The enhanced mixing of the coolant is caused by the interaction of stationary fins 50 and rotating fins 52 on the coolant located between fins 50, 52.

A resistive heater 90 (FIG. 3) is used to control the temperature range of the neon within heat pipe assembly 42. Temperature control is necessary because the condensation and boiling of the neon at the cold and hot ends of the heat pipe assembly occur only over a small temperature range. If the coolant in heat transfer gap 46 is neon, heater 90 is used to prevent the temperature of the neon from dropping below 24–25 K where neon freezes.

Heat pipe assembly 42, cooling block 54, cylinder 40 and extension 48 are preferably formed of copper. Region 80 surrounding heat transfer assembly 16 and region 82 surrounding winding 18 are held under vacuum. Fins 50, 52 are, for example, about 6 inches long, and extension 48 has an outer diameter of about 4 inches. Tube 60 has an inner diameter of about 0.75 inch, and tubes 62 have an inner diameter of about 0.1 inch and are radially located about tube 60 on a diameter of about 4 inches.

Other embodiments are within the scope of the following claims. For example, referring to FIG. 5, heat transfer assembly 16 can be replaced with a circulation system which relies on condensation and mass transport for cooling winding 218. A single copper extension 248 extends from a cryocooler 212. Coolant located within a vacuum enclosure 217 transfers heat from winding 218 to cryocooler 212. The enclosure defines a closed circulation system with coolant being vaporized at winding 218 and condensed at copper finger 248.

To dissipate the heat from winding 218, vapor flows from winding 218 and contacts extension 248 where the vapor is cooled and condenses to a liquid. The liquid coolant drops off extension 248 under the force of gravity. As shown in FIG. 6, the liquid coolant 213 flows toward the warmer end at coils 218 and is vaporized. Referring also to FIG. 7, rotor 222 can include a flow ring 215 defining slots 221 which aid in channeling the liquid coolant toward the warm end. During cooldown the winding may be cooled the same way or supplemented by an additional bayonet. During cooldown, two phase nitrogen could be the preferred fluid, while during operation a lower boiling point fluid might be preferred for heat transfer.

Figure 8:
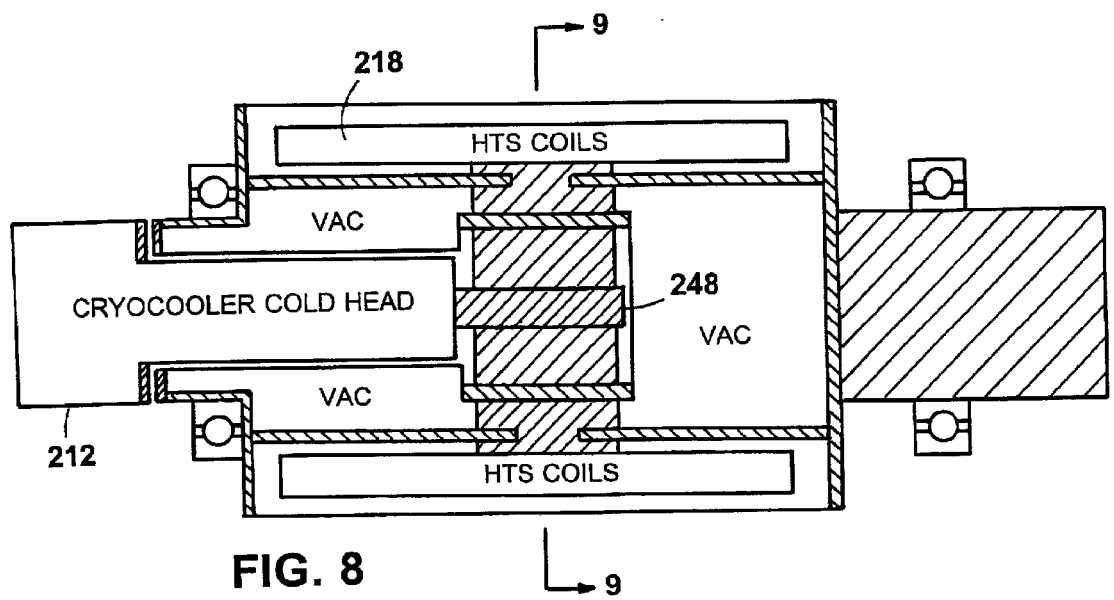
FIG. 8 is a cross-sectional side view of an alternative embodiment of a superconductor rotor cooling system.
Figure 9:
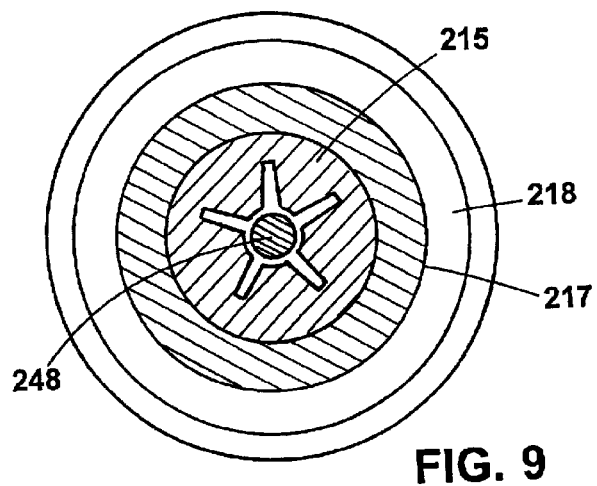
FIG. 9 is an end view of the cooling system of FIG. 8, taken along lines 9—9 in FIG. 1.

Referring to FIGS. 8 and 9, copper extension 248 of cold head 212 can be radially aligned within coils 218. In the configuration of FIG. 5, axial mass transport convects heat to the cryocooler interface 248, which is more conveniently located in the shaft 217; while in the configuration of FIG. 8, the coldhead and heat transfer surface 248 exted radially inside coild 218 avoiding the necessity for axial heat transport. Alternative embodiments for the shape of the cooling system are shown in FIGS. 6 and 9.

Figure 10:
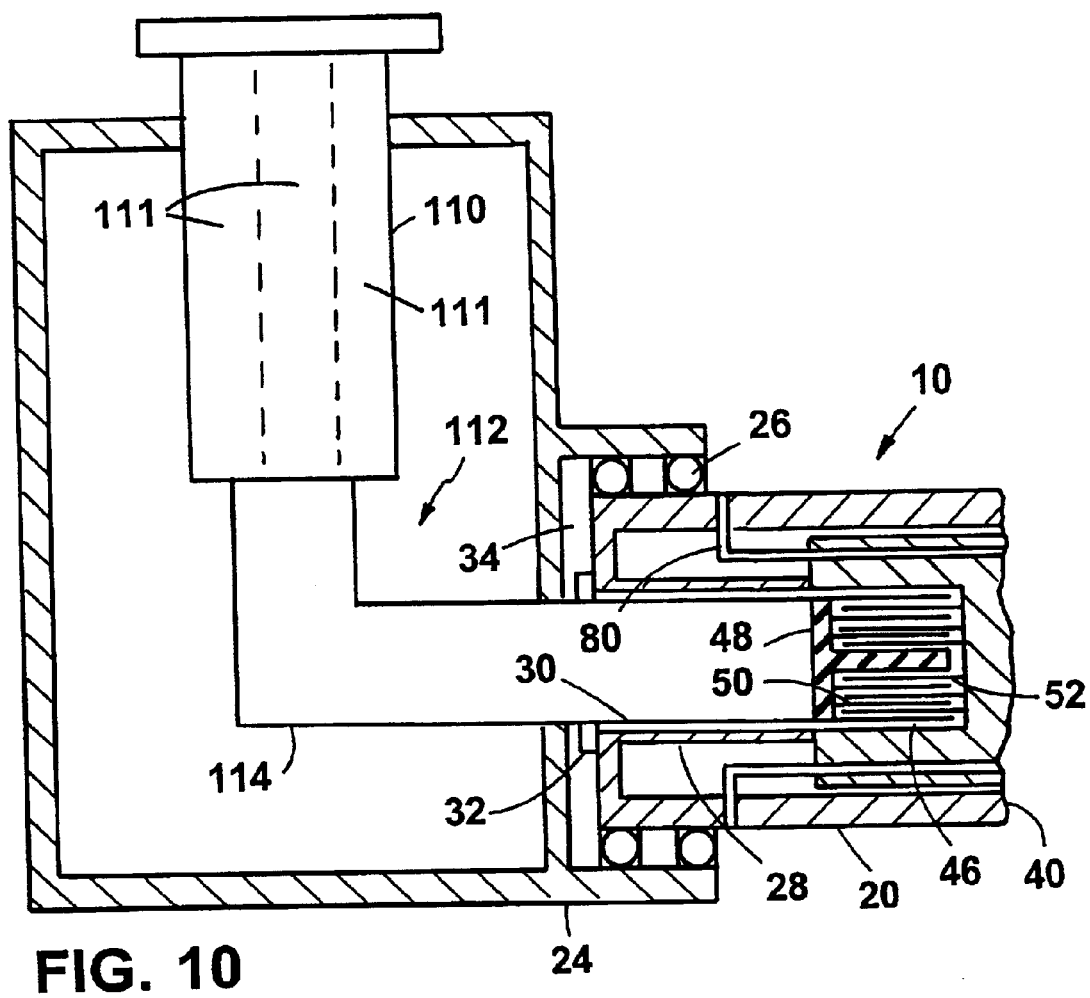
FIG. 10 is a cross-sectional side view of an alternative embodiment of a superconductor rotor cooling system.
Figure 11:
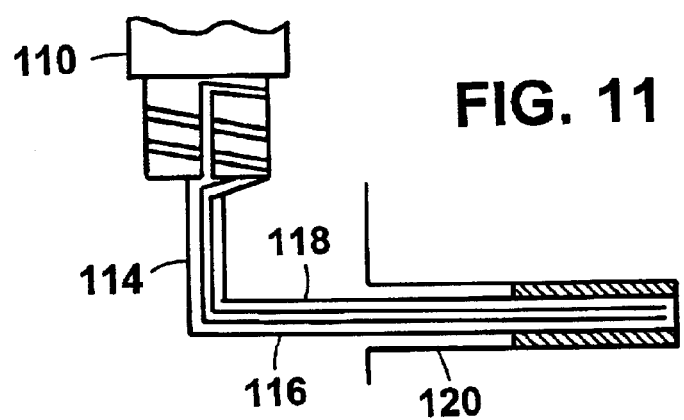
FIG. 11 is a cross-sectional side view of a heat pipe bayonet of the cooling system of FIG. 10.

Referring to FIGS. 10 and 11, to increase the cooling capacity of the cryocooler such that a broad range of refrigeration requirements can be met, multiple coldheads 110, for example, two or three coldheads, can be bundled in a cryocooler assembly 112. A heat pipe bayonet 114 connects coldheads 110 to extension 48 or 248. Bayonet 114 is gravity-fed to supply condensed neon down a center tube 116. A return jacket 118 provides a path for vapor to return to the coldhead. A vacuum jacket 120 surrounds return jacket 118.

Figure 12:
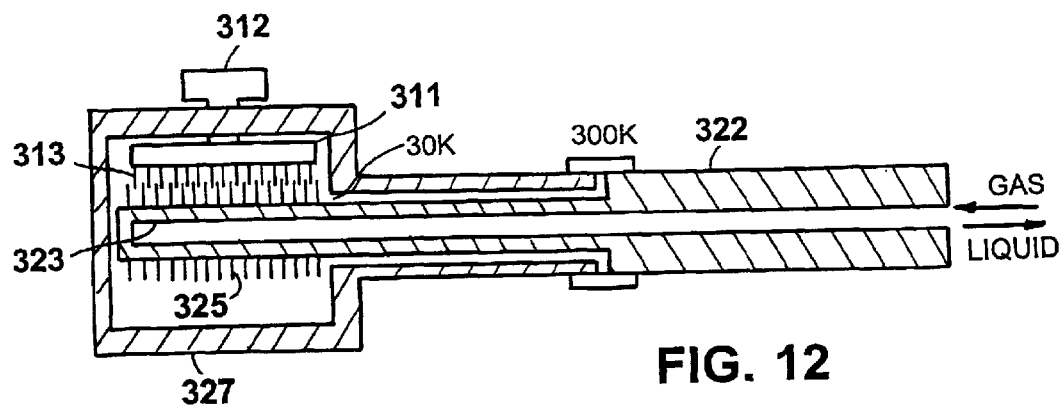
FIG. 12 is a cross-sectional side view of an alternative embodiment of a superconductor rotor cooling system.

Referring to FIG. 12, in another embodiment, a hollow rotor 322 includes a condenser section 323 locating in the rotating frame. The condenser section is positioned within a stationary, vacuum insulated enclosure 327. A coldhead 311 of a cryocooler 312 is located within enclosure 327. Coolant, for example, hydrogen, neon or nitrogen, in enclosure 327 is cooled by cryocooler 312. Coolant, for example, neon, within rotor 322 evaporates at the coils and flows through rotor 322 to condenser 323 where it is condensed to a liquid. The coolant within enclosure 327 and within rotor 322 define a closed circulation system. Condenser section 323 includes fins 325, and coldhead 311 of a cryocooler 312 can include fins 313 intermeshed with fins 325.

Figure 13:
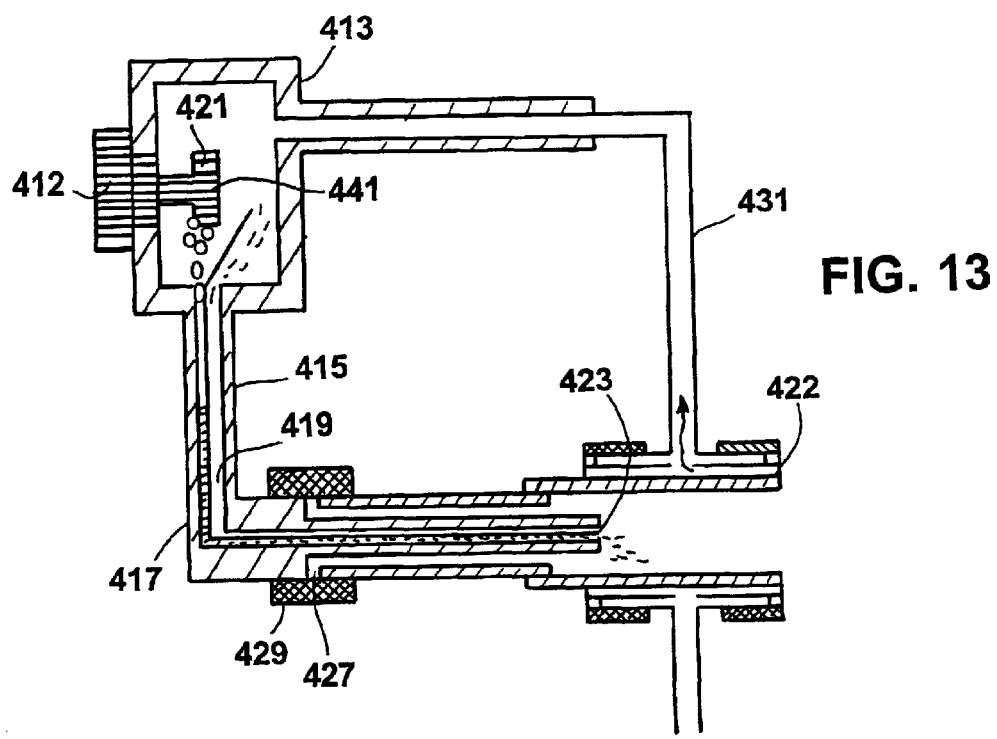
FIG. 13 is a cross-sectional side view of an alternative embodiment of a superconductor rotor cooling system.

Referring to FIG. 13, a closed circulation system includes a vacuum insulated pipe 415 defining a first channel 417 which delivers liquid coolant from a surface 441 of a coldhead 411 of a cryocooler 412 to rotor 422, and a second channel 419 which returns coolant vapor to the surface of the coldhead 411. Coldhead 411 is located in a vacuum insulated enclosure 413. The cryogen is condensed at the surface of the coldhead.

In one embodiment, the heat exchanger can be connected to the coldhead to increase the cold surface area. The liquid coolant moves from coldhead 411 to rotor 422 by gravity. The liquid coolant moves from the stationary frame to the rotating frame at pipe opening 423. Gravity, centrifugal force and wicks can be used to transport the liquid coolant to the coils. The annulus 427 between the stationary pipe 415 and the rotating rotor is sealed by a seal 429, preferably a non-contact ferrofluidic seal. Coolant vapor returns through channel 419 to coldhead 411 by cryopumping. An additional warm vapor return line 431 can be provided. If return line 431 is vacuum insulated, line 431 can also return intermediate temperature coolant to provide additional cooling to the various loads. After cooling the winding, a portion of the returning flow can be diverted to intercept the heat loads to the current leads as well as the parasitic load. The portion used to cool the parasitic loads will be returned at intermediate temperature. A second coldhead may be included in some emobdiments.

What is claimed is:
1. A system for cooling a superconductor device located in a rotating reference frame, the system comprising:
   a cryocooler located in a stationary reference frame; and
   a closed circulation system external to the cryocooler, the closed circulation system,
      interfacing the stationary reference frame with the rotating reference frame,
      effecting flow of a coolant, in liquid form, by gravity, from a first end in the stationary reference frame, to a second end in the rotating reference frame, the second end being in thermal association with the superconductor device, and
      effecting a return flow of the coolant in vapour form from the second end to the first end;
   the closed circulation system including a stationary pipe extending from the first end to the second end to direct the liquid coolant from the first end to the second end.

2. The system of claim 1, wherein the stationary pipe comprises walls forming a liquid-coolant channel for directing coolant, in liquid form, from the first end to the second end.

3. The system of claim 1, wherein the stationary pipe comprises walls forming a vapour-coolant channel for directing coolant, in vapour form, from the second end to the first end.

4. The system of claim 1, wherein the stationary pipe is disposed to collect liquid coolant condensed on the cryocooler.

5. The system of claim 1, further comprising a walls forming an additional coolant channel for directing coolant, in vapour form, from the superconductor device to the cryocooler.

6. A rotating machine comprising:
a superconductor device located in a rotating reference frame; and
a system as recited in claim 1.

7. A system for cooling a superconductor device, the system comprising:

a cryocooler located in a stationary reference frame, and a passive closed circulation system external to the cryocooler interfacing the stationary reference frame with a rotating reference frame in which the superconductor device is located, the passive closed circulation system having a first end, a second end, and a stationary pipe extending from a first end to a second end to direct the liquid coolant from the first end to the second end.

8. A method of cooling a superconductor device, comprising the steps of:

locating a cryocooler in a stationary reference frame, and transferring heat from a superconductor device located in a rotating reference frame to the cryocooler through a passive closed circulation system external to the cryocooler interfacing the stationary reference frame with the rotating reference frame, the closed circulation system having a first end, a second end, and a stationary pipe extending from a first end to a second end to direct the liquid coolant from the first end to the second end.

* * * * *